United States Patent [19]

Bianchini

[11] 4,119,809
[45] Oct. 10, 1978

[54] BRAILLE LENS FOR TELEPHONE DIALS
[76] Inventor: Pearl N. Bianchini, 890 Roble Ave., Menlo Park, Calif. 94025
[21] Appl. No.: 742,541
[22] Filed: Nov. 17, 1976
[51] Int. Cl.² .............................................. H04M 1/21
[52] U.S. Cl. ................................. 179/90 A; 35/35 A
[58] Field of Search ............. 179/90 A, 90 AN, 90 R; 35/35 A

[56] References Cited
U.S. PATENT DOCUMENTS

| 2,512,457 | 6/1950 | Disken | 179/90 A |
|---|---|---|---|
| 2,516,592 | 7/1950 | Richter et al. | 179/90 A |
| 2,754,370 | 7/1956 | Gauvreau | 35/35 A |
| 2,800,727 | 7/1957 | Potter | 35/35 A |
| 3,193,625 | 7/1965 | Triplett | 179/90 A |
| 3,197,573 | 7/1965 | Anson | 179/90 A |
| 3,250,023 | 5/1966 | Benson | 35/35 A |

Primary Examiner—Kathleen H. Claffy
Assistant Examiner—Gerald L. Brigance
Attorney, Agent, or Firm—Julian Caplan

[57] ABSTRACT

A domed member is positioned on the center of a telephone dial. Opposite each finger hole is a raised identifying character such as a Braille number corresponding to the number of the finger hole or a raised Arabic number which can be readily identified by a blind person. A flat on the edge of the member is oriented with the finger stop to assist in locating the member relative to the dial. Preferably the member is removable so that it may be installed and removed while traveling. For such purpose, the base of the member may have pressure-sensitive adhesive, or the member may be hollow and contain a suction cup, or the member may have clips for attachment.

5 Claims, 6 Drawing Figures

BRAILLE LENS FOR TELEPHONE DIALS

This invention relates to braille lens for telephone dials for use of blind people. In accordance with the present invention, a domed member is attached by various means hereinafter described to the center of a conventional telephone dial inside the finger hole of such dial. The domed member has raised braille characters opposite the holes of the dial to assist the user in identifying the number of the finger hole. Alternatively, instead of braille characters, raised Arabic numerals may be substituted. Thus, by the fingers identifying the characters raised on the domed member attached to the dial, the proper hole to dial a telephone number may be identified.

Another feature of the invention is the fact that means may be employed to orient the domed member relative to the dial so that a blind person may install the device in place.

Another feature of invention is the fact that the device may be readily installed and removed. If the user is traveling, the device may be temporarily applied to a telephone wherever needed. A means is provided to facilitate prying the device off the dial when it is to be removed.

The device may, if desired, be made of a clear plastic so that sighted users may read the telephone numbers on the dial.

As hereinafter explained, various means may be employed to attach the device to the telephone.

Other objects of the present invention will become apparent upon reading the following specification and referring to the accompanying drawings in which similar characters of reference represent corresponding parts in each of the several views.

Figure 1:
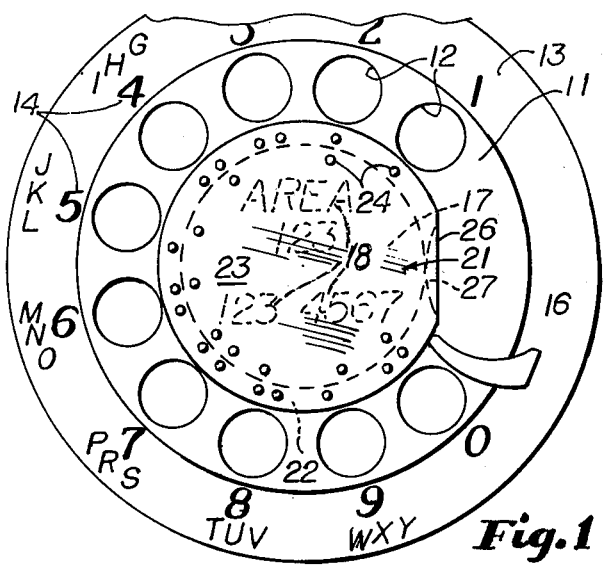
FIG. 1 is a top plan view of a telephone dial with the device attached.

There are a number of different telephone dials in commercial use. One of these is illustrated in FIG. 1. Dial 11 has ten finger holes 12, in which a finger is inserted to operate the dial. In one form of a commercial dial, surrounding the dial 11 (which turns) is an outer ring 13 on which are printed numbers and letters 14 which identify the finger hole 12 to sighted persons but which are not identified by the blind. A finger stop 16 is conventionally attached to the outer ring 13. Within the finger holes 12 is the center 17 of the dial. Conventionally, a telephone area code and a telephone number 18 are printed thereon. In one form of the present invention, the indicia 18 may be read even when the device hereinafter described is in place.

Figure 2:
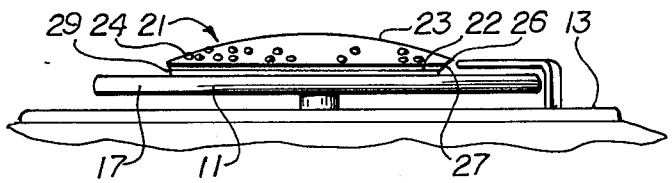
FIG. 2 is an elevational view of a portion of the structure of FIG. 1.
Figure 3:
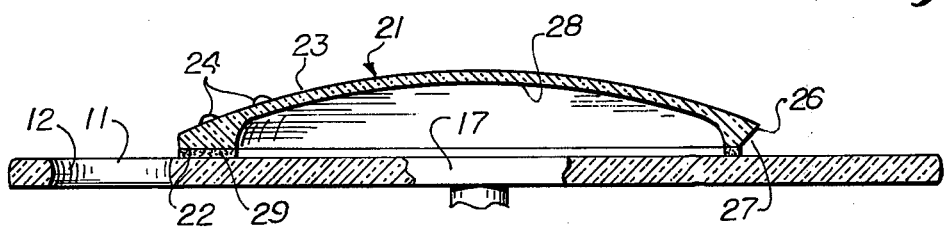
FIG. 3 is an enlarged mid-sectional view through the structure of FIGS. 1 and 2.

Member 21, which is purposely dome shaped, is attached to the center 17. Member 21 has an annular base 22 and a spherical top 23 which is in one form of the invention hollow, as indicated by the underside 28 of the top 23 (see especially FIG. 3). On the top 23 near the outer edge of domed member 21, braille indicia 24 are raised opposite the finger holes 12 to identify the holes by touch. In order to orient the member 21 relative to the dial 11, a flat 26 is formed thereon between the 1 hole and the 0 hole. When placed so that the flat 26 is vertical (as in FIG. 1) the indicia 24 will line up properly with the holes 12. In one form of the invention, as shown in FIGS. 1–3, pressure-sensitive adhesive 29 is applied to the annular base 12 to attach the member 21 to the dial 11. If the member 21 is made of a clear plastic, the indicia 18 may be read through the member 21 by sighted persons.

Although not illustrated here, it should be understood that instead of being domed, the member 21 may be solid, and instead of being transparent it may be opaque.

Figure 4:
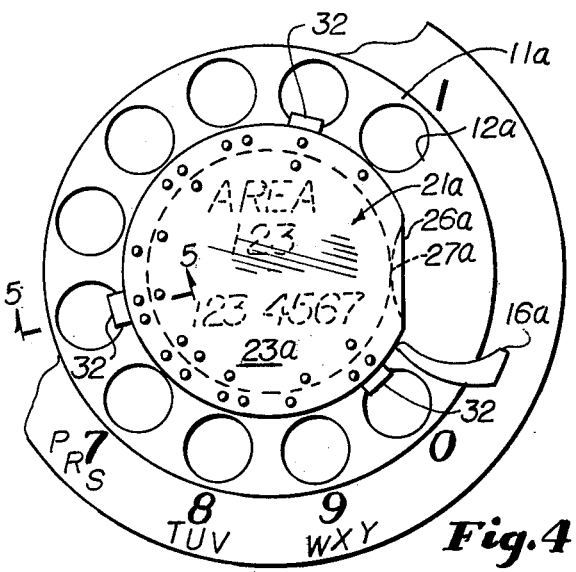
FIG. 4 is a view similar to FIG. 1 of a modification.
Figure 5:
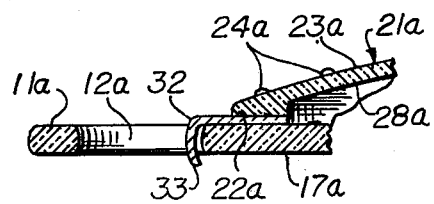
FIG. 5 is an enlarged fragmentary sectional view taken substantially along the line 5—5 of FIG. 4.

In the form of the invention shown in FIGS. 4 and 5, instead of pressure-sensitivity, a plurality of clips 32 are attached to the member 21 and have downward-inward turned resilient tips 13 which are inserted through the holes 12a and clip under the edge of the center portion 17a. By pressing downward on the member 21d the clip tips 33 permit installation, and by prying upward the clip 32 flexes to permit removal.

Figure 6:
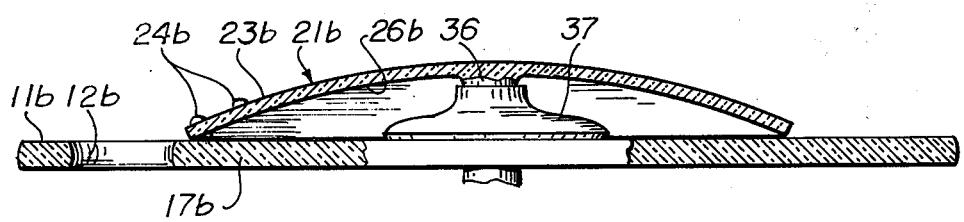
FIG. 6 is a view similar to FIG. 3 of another modification.

FIG. 6 illustrates an alternative means of attaching the domed member 21b to the central portion 17b of dial 11b. The underside 26b of member 21b is formed with a stem 36, and a suction cup 37 is fixed to stem 36. The suction cup is used to attach the device to the center 17b of the dial 11b.

In many respects the structure illustrated in FIGS. 4–6 resembles those shown in FIGS. 1–3, and the same reference numerals followed by the subscripts a and b respectively are used to designate corresponding parts.

What is claimed is:

1. A member to be positioned in the middle of a standard telephone dial to assist the blind in locating the finger holes of said dial comprising a transparent body having a convex upper surface having a maximum size to fit on said dial with the periphery of said convex upper surface of said body adjacent but spaced inward of the finger holes of said dial, raised Braille indicia on the upper surface of said body near the periphery thereof radially aligned with the numeral designations of said finger holes, attachment means to attach said body to the center of the dial so that said finger holes are substantially unobstructed, said attachment means engaging only said standard telephone dial, said body being removable from said dial, and means integrally formed in said body for orienting said body by touch to align the Braille indicia radially the numeral designations.

2. A member according to claim 1 in which said orienting means comprises one portion of the peripheral edge of said body formed with a flat to assist the blind in properly aligning the member with the dial.

3. A member according to claim 1 in which said attachment means comprises pressure-sensitive adhesive on the bottom of said body.

4. A member according to claim 1 in which said attachment means comprises resilient fingers adapted to fit through the finger holes of said dial and grip under the dial.

5. A member according to claim 1 in which said attachment means comprises a suction cup on the underside of said body.

* * * * *